(12) United States Patent
Lafontaine

(10) Patent No.: US 7,331,440 B2
(45) Date of Patent: Feb. 19, 2008

(54) AUTOMATED ORDER MIXING SYSTEM

(76) Inventor: Daniel R. Lafontaine, 370, Chemin Thauvette, Vaudreuil-Dorion, Quebec (CA) J7V 6Z6

( * ) Notice: Subject to any disclaimer, the term of this patent is extended or adjusted under 35 U.S.C. 154(b) by 95 days.

(21) Appl. No.: 11/258,091

(22) Filed: Oct. 26, 2005

(65) Prior Publication Data

US 2006/0088404 A1    Apr. 27, 2006

Related U.S. Application Data

(60) Provisional application No. 60/621,668, filed on Oct. 26, 2004.

(51) Int. Cl.
 *B65G 37/00* (2006.01)

(52) U.S. Cl. ................... 198/349; 198/359; 198/347.4; 700/217; 414/268

(58) Field of Classification Search ............. 193/35 A, 193/35 R; 198/448, 347.4, 349, 359; 414/789.6, 414/791.6, 268, 797.9, 795.8; 700/216, 217

See application file for complete search history.

(56) References Cited

U.S. PATENT DOCUMENTS

| | | | |
|---|---|---|---|
| 2,808,946 A | 10/1957 | Just et al. | |
| 4,835,702 A * | 5/1989 | Tanaka | 700/217 |
| 5,018,073 A | 5/1991 | Goldberg | |
| 5,230,206 A * | 7/1993 | Christ | 53/501 |
| 5,271,703 A * | 12/1993 | Lindqvist et al. | 414/268 |
| 5,361,889 A | 11/1994 | Howell et al. | |
| 5,454,688 A * | 10/1995 | Pippin | 414/797.9 |
| 5,934,864 A | 8/1999 | Lyon et al. | |
| 6,186,724 B1 * | 2/2001 | Hollander | 193/35 A |
| 6,425,226 B1 * | 7/2002 | Kirschner | 53/445 |
| 6,450,751 B1 * | 9/2002 | Hollander | 414/268 |
| 6,640,953 B2 | 11/2003 | Brouwer et al. | |
| 7,184,855 B2 * | 2/2007 | Stingel et al. | 700/216 |
| 2003/0138312 A1 | 7/2003 | Watson et al. | |
| 2003/0176944 A1 | 9/2003 | Stingel, III et al. | |
| 2004/0191050 A1 | 9/2004 | Lafontaine et al. | |

* cited by examiner

*Primary Examiner*—James R. Bidwell
(74) *Attorney, Agent, or Firm*—Equinox Protection; Franz Bonsang, Patent Agent

(57) ABSTRACT

An automated order mixing system includes a mixing subsystem having a plurality of angled vertically stacked product guides feeding a mixing conveyor whereon a client's order of product cases is processed, the vertical stacking enabling the creation of a number of product feed paths within a relatively small floor space.

16 Claims, 6 Drawing Sheets

AUTOMATED ORDER MIXING SYSTEM

CROSS REFERENCE TO RELATED APPLICATIONS

Benefit of U.S. Provisional Application for Patent Ser. No. 60/621,668, filed on Oct. 26, 2004, is hereby claimed.

FIELD OF THE INVENTION

The present invention concerns order-handling systems, more particularly to order-handling systems for merging product cases.

BACKGROUND OF THE INVENTION

Distribution warehouses handle large volumes of products, which are often packed and palletized onto pallets on site. High volume manufacturers with a wide product range, such as those in the beverage industry, routinely ship orders after a customer has ordered a variety of specific products. Typically, systems that handle the products consist of pallets containing different assortments of shipping cases, palletizing and depalletizing stations and a series of conveyor belts interconnecting the system. While this type of system has worked well in the past, with the advent of more diversified products, they have become time-consuming and labor intensive. System designers are continuously looking for new technology to reduce the time, and manpower required preparing these orders.

Several order handling systems exist, a few examples of which are as follows:
- U.S. Patent Application Publication No. 2004/0191050, published Sep. 30, 2004 to Lafontaine et al. for "Order Handling System";
- U.S. Pat. No. 6,640,953, issued Nov. 4, 2003, to Brouwer et al. for "Controlled Gravity Accumulation Conveyor";
- U.S. Patent Application Publication No. 2003/0176944, published Sep. 18, 2003 to Stingel III et al. for "Automated Container Storage and Delivery System";
- U.S. Patent Application Publication No. 2003/0138312, published Jul. 24, 2003 to Watson et al. for "Depalletizer for a Material Handling System";
- U.S. Pat. No. 6,425,226, issued Jul. 30, 2002, to Kirschner for "System and Method for Order Packing";
- U.S. Pat. No. 5,934,864, issued Aug. 10, 1999, to Lyon et al. for "Case Picking System";
- U.S. Pat. No. 5,361,889, issued Nov. 8, 1994 to Howell et al. for "Apparatus for Merging Multiple Lanes of Product";
- U.S. Pat. No. 5,018,073, issued May 21, 1991, to Goldberg for "High Density Loaded Sorting Conveyors"; and
- U.S. Pat. No. 2,808,946, issued Oct. 8, 1957, to Just et al. for "Warehouse Equipment".

The aforesaid designs suffer from a number of important drawbacks. Disadvantageously, many of the designs are complex and include many conveyor systems with multiple curves, which cover a large area thereby making inefficient use of a warehouse floor space. Moreover, the conveyor systems are often electrically powered, the use of which may be prohibitively expensive. Some systems appear to be designed specifically for conveying and mixing specific product types and include complex counting and dispensing mechanisms. In addition, the expense of operating the powered systems may be too high to yield sufficient payback when compared to a more manual method.

Thus, there is a need for an improved system for order handling.

SUMMARY OF THE INVENTION

It is therefore a general object of the present invention to provide an improved system for order handling.

It is an object of the present invention to obviate or mitigate at least one disadvantage of previous order mixing systems.

An advantage of the present invention is that the space occupied by the system is smaller than its conventional counterpart.

Another advantage of the present invention is the relative simplicity of the interrelationship of the various system elements, thus yielding a more cost effective and efficient client ordering system.

A further advantage of the present invention is that the various system elements are designed to focus upon the actual needs of the order handling.

According to an aspect of the present invention, there is provided an order handling system for merging product cases including an automatic depalletizing sub-system, a product re-stocking sub-system, said sub-systems being controllably adapted to deliver product cases to a mixing sub-system, said mixing sub-system comprising a plurality of product storage guides vertically stacked one above the other and at least one mixing conveyor in vertical alignment with one another and with at least one mixing conveyor, said product storage guides forming thereby a vertical array thereof, said storage guides being provided with associated product release devices selectively delivering product cases directly onto said at least one mixing conveyor, each storage guide having one said associated product release device extending therefrom.

More than one vertical array of product storage guides may be provided and the arrays may be disposed side-by-side.

Advantageously product release means are provided in association with respective said storage guide and adapted to release product cases in a predetermined sequence according to type and quantity onto the or each mixing conveyor, the sequence, type and quantity being defined by a client order, whereby the order or a part thereof is completed.

A control system is provided for controlling the release of the product cases in said predetermined sequence.

The product storage guides may be of an accumulating or non-accumulating type, and may be powered or gravity operable. The guides may further be provided with means for varying the speed of product case travel therealong, whereby appropriate devices being associated therewith for that purpose, for example brake rollers.

The product storage guides are typically disposed at a guide angle relative to said at least one mixing conveyor depending upon the physical characteristics of the product case. Equally, the mixing conveyor may be disposed at a mixing angle relative to a ground floor to suit specific product case requirements and in a complementary manner with the guide angle. The product restocking sub-system may be automated and accordingly is operable upon an appropriate command from a central control adapted to monitor the flow of product cases in the various sub-systems with the object of replenishment as and when required. The product restocking sub-system may, in the alternative, be manually operable and accordingly the product guides will be short in comparison to those deployed in an automated format.

The product re-stocking sub-system may comprise a number of transfer devices each of which may constitute a restocking conveyor or may be orientable for the purpose of diverting product flow onto a particular or respective product storage guide downwardly located there from.

The restocking conveyor may be fed by conventional means such as a gantry robot layer de-palletizing system and/or several dedicated depalletizers for high moving product cases. In the alternative a mechanized layer depalletizing using a special tool including a special forklift attachment may be employed. Such a forklift attachment may incorporate sensors and controls which reduce dependence on operator skill.

According to another aspect of the present invention, there is provided an order handling system arrangement including a plurality of order handling systems as described hereinabove and disposed side-by-side for merging product cases, said systems being controllably adapted for selective delivery of product cases onto at least one transversal central order sequencing conveyor.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

Figure 1:
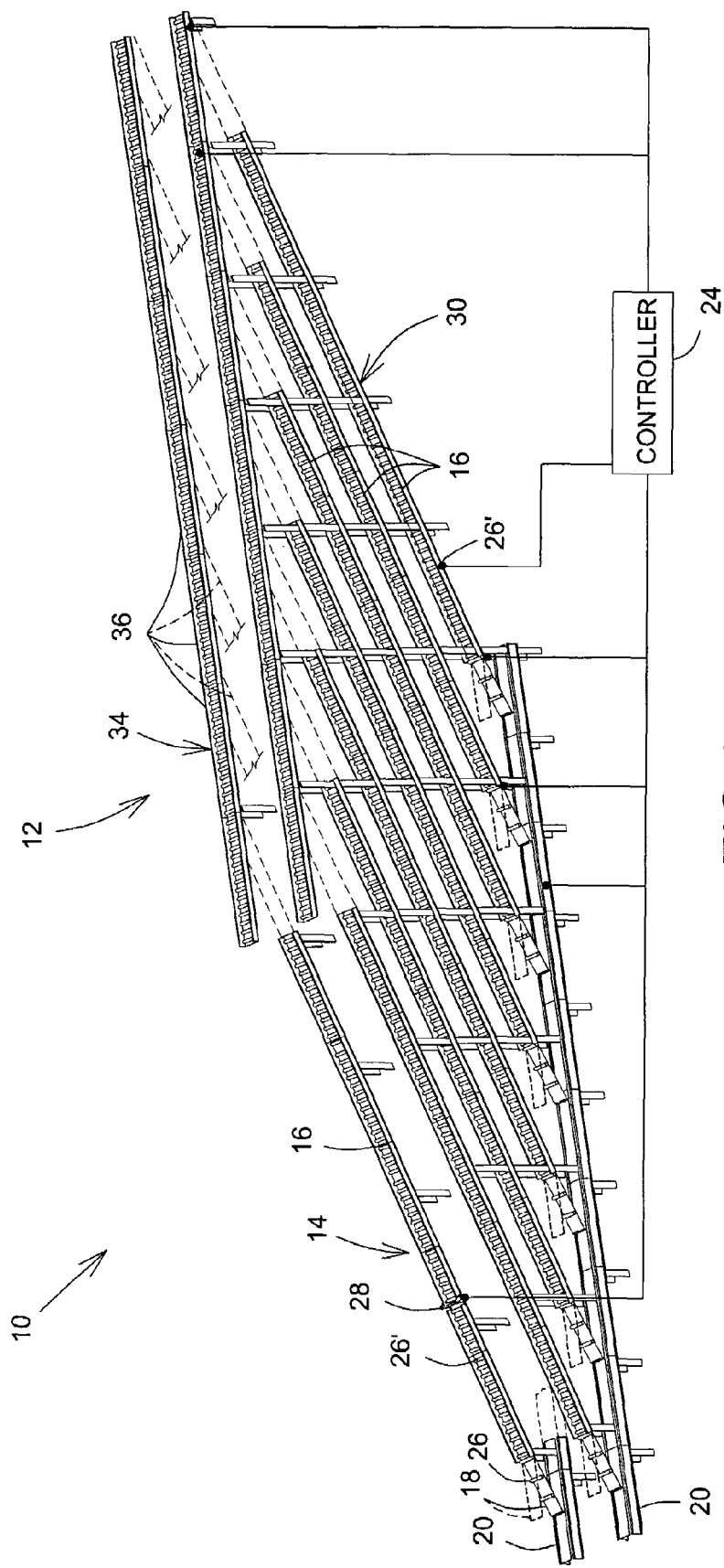
FIG. 1 is an isometric view of two sets of angled product storage guides with their mixing conveyors and automatic re-stocking conveyors shown.

With reference to the annexed drawings the preferred embodiments of the present invention will be herein described for indicative purpose and by no means as of limitation.

Generally, the present invention provides a method and system 10 for automated order handling. An embodiment of the system includes an automatic layer de-palletizing sub-system and product re-stocking sub-system 12, which feeds a mixing subsystem 14 comprising product storage guides 16, product release means or devices 18 and a mixing conveyor 20. Product cases (not shown) are automatically released from these product storage guides 16 via lowerable guides 18 extending therefrom onto a mixing conveyor 20 to prepare a sequence of products. Each sequence of products forms a client order or part of an order of products to be palletized.

Several such sub-systems and corresponding mixing conveyors can be provided as required to handle the desired number of products. Completed orders are palletized, and then loaded on a truck for shipment to the client.

Figure 2:
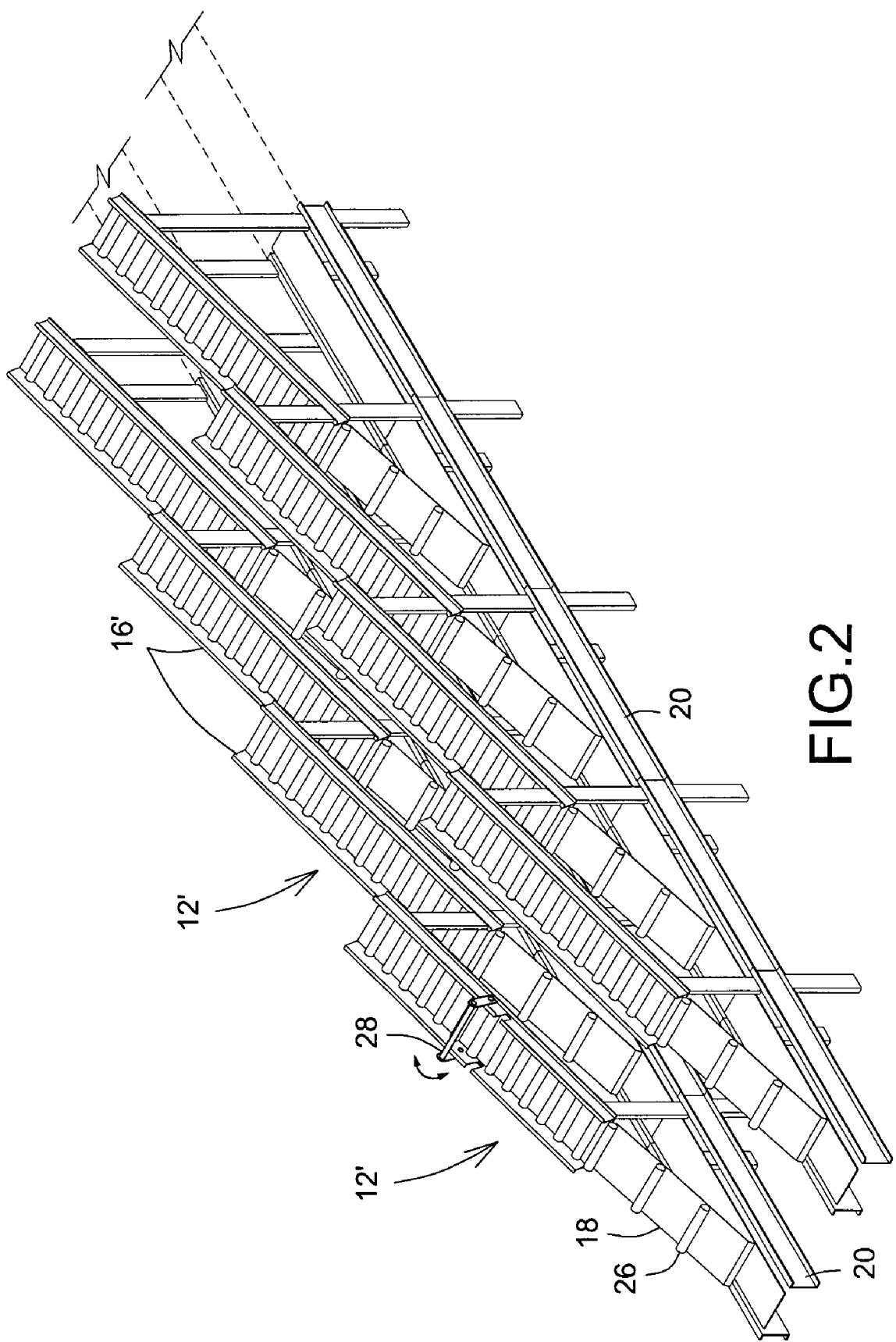
FIG. 2 is an isometric view of two sets of angled product storage guides with their mixing conveyors provided for manual re-stocking.
Figure 3:
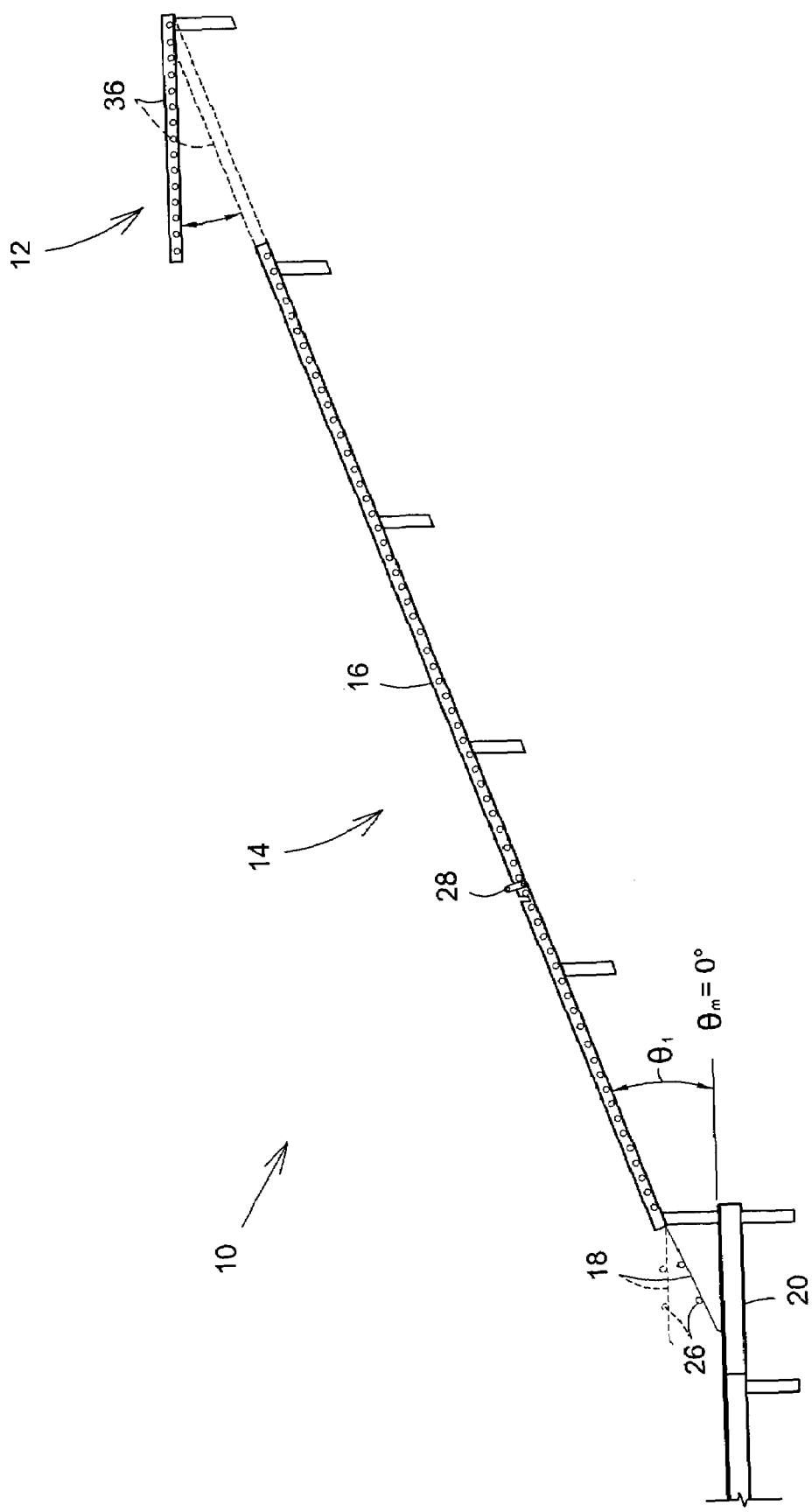
FIG. 3 is an elevation of one angled product storage guide.

Mixing Sub-System 14 (Refer to FIGS. 1, 2 and 3)

In an embodiment of the present invention, vertically stacked and generally rectilinear, angled product storage guides 16 disposed in vertical alignment one above the other and also in vertical alignment above a mixing conveyor 20 allow an orderly sequence of products to be created on the mixing conveyor 20.

A control system 24 automatically commands the orderly release of the required products to deposit a pre-determined sequence of different quantities of different products on the mixing conveyor 20 below (only connections to few product release devices 18, speed control devices 26' and/or transfer devices 36 are shown for illustration purposes).

The angled product storage guides 16 can be of an accumulating (long) or non-accumulating (short) type, and can be motorized or non-motorized (this is not illustrated in detail).

The speed of travel of the products as they move in the angled product storage guides can be controlled using various speed control means or devices 26' including brake rollers.

Product retention and release mechanisms 28 hold the product in the angled product storage guides 16 until such time as they are commanded to release unto the mixing conveyor 20. When long angled product guides (see item 16 in FIGS. 1 and 3) are used there can be several of these release mechanisms 28 used to control the flow of product.

In an embodiment of the present invention, the product is transferred from the product storage guide 16 to the mixing conveyor 20 via a lowerable guide 18 i.e. equipped with devices 26 to control the speed of the products as they are transferred.

Figure 4:
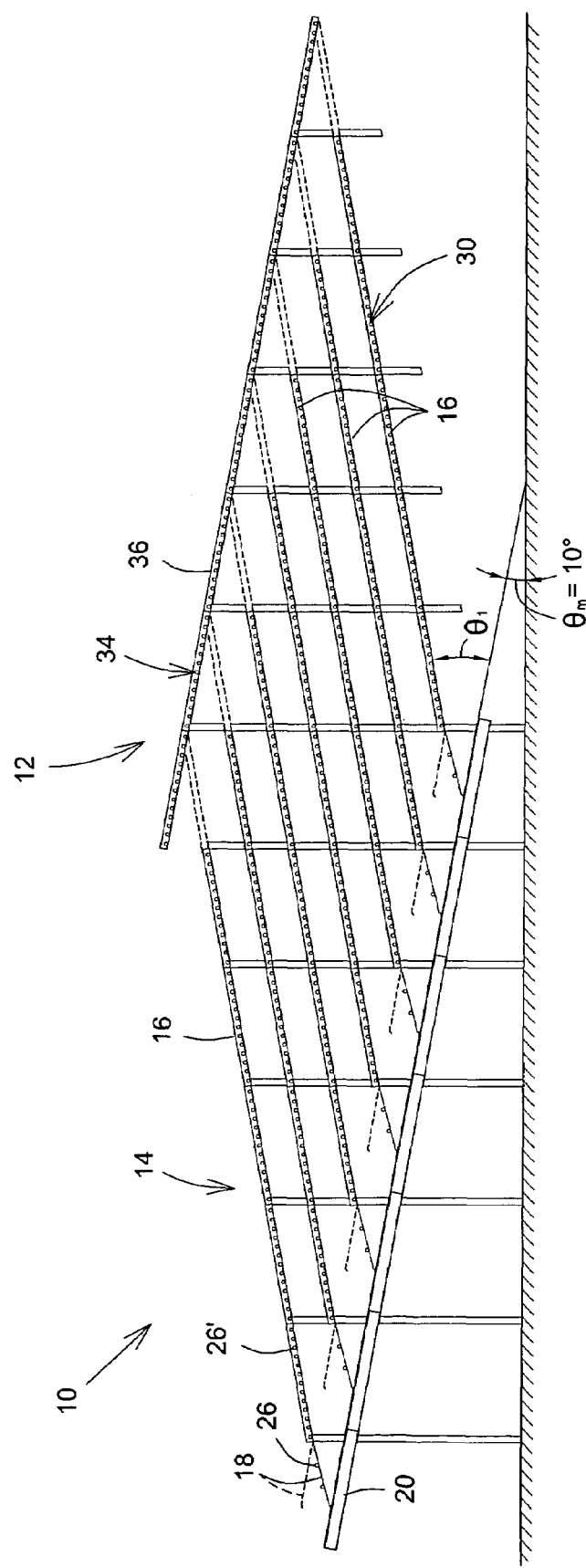
FIG. 4 is an elevation of a mixing sub system tilted to reduce the downward slope of the angled product storage guides, while making the mixing conveyor slope upwards.

In FIG. 3 the angle $\Theta_1$ is defined as the guide angle formed by the angled product storage guides 16 and the mixing conveyor 20. In FIG. 3 the mixing angle $\Theta_m$ is defined as the angle between the mixing conveyor 20 and the ground. In FIG. 3 it is about zero and in FIG. 4 it is about 10 degrees. As can be seen from FIGS. 3 and 4, embodiments of the present invention advantageously use angles $\Theta_1$ and $\Theta_m$ appropriate to (or based on) the configuration of the system and the type of products being handled. The angle $\Theta_1$ and the product clearance height define the minimum distance (or pitch) between two successive angled product storage guides. The choice of angles $\Theta_1$ and $\Theta_m$ is made according to the product clearance height desired, the weight of the product and the fragility of the contents. The angles illustrated in FIG. 4 would be typical of a 35 lb corrugated box containing glass bottles of beverage. The mixing conveyor is shown sloping upwards at angle $\Theta_m$ of about 10 degrees in FIG. 4 which allows the downward slope of the angled product guides to be less pronounced.

The advantage of using this configuration is that the angled product storage guides 16 can be manufactured using very low cost conveyor types. For example, when angle $\Theta_1$ is small, inexpensive gravity roller conveyors can be used. This type of installation can require speed control devices 26', and requires at least one but possibly many product retention and release mechanisms 28, such as metering belts, friction brakes or pop up stoppers 28 (shown in dotted lines in a raised stopping position). Also when angle $\Theta_1$ is small or zero, driven, accumulating roller conveyors typically called line shaft conveyors can be used. This type of installation requires at least one but possibly many product retention and release mechanisms 28, such as a metering belt (not shown).

Figure 5:
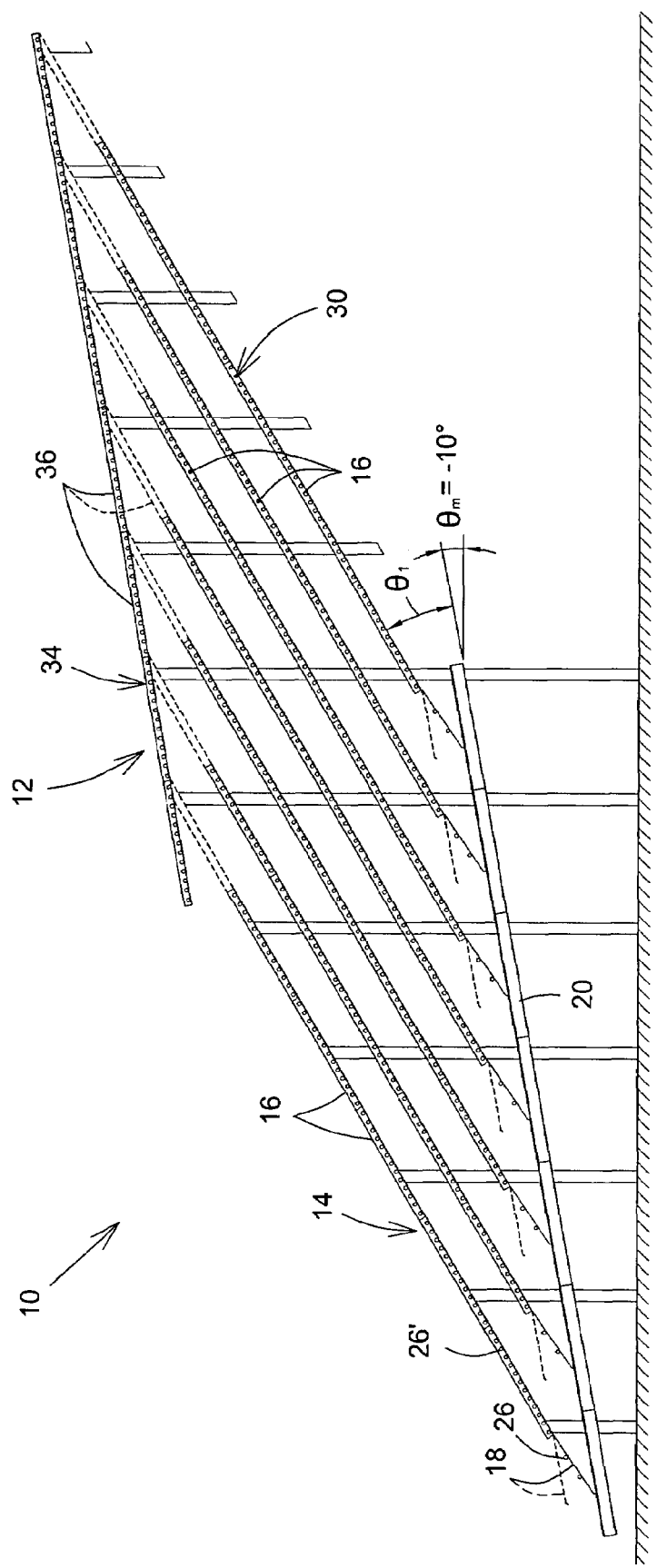
FIG. 5 is an elevation of a mixing sub system tilted to increase the downward slope of the angled product storage guides, while making the mixing conveyor slope downwards.

It should be noted that angle $\Theta_m$ can also be negative in the case that the mixing conveyor 20 is a downwards sloping gravity roller conveyor. This is shown in FIG. 5.

A pair, or more than one series or arrays 30, of angled product storage guides 16 can be placed side-by-side to form a pair or more, allowing still better use of floor space, as shown in FIGS. 1 and 2. A pair of mixing conveyors 20 with a series of angled product storage guides 16 above can be disposed in an existing aisle space (not illustrated) between two existing product racks, or simply between rows of pallets disposed on the floor.

The angled product storage guides 16 can include an accumulating roller conveyor or a motorized conveyor which constitutes a product storage buffer, for one particular product. These product storage guides can be re-stocked manually as shown in FIG. 2, especially when not too high to allow manual feeding thereof by an operator, or by an automated re-stocking system 12 as shown in FIG. 1.

Figure 6:
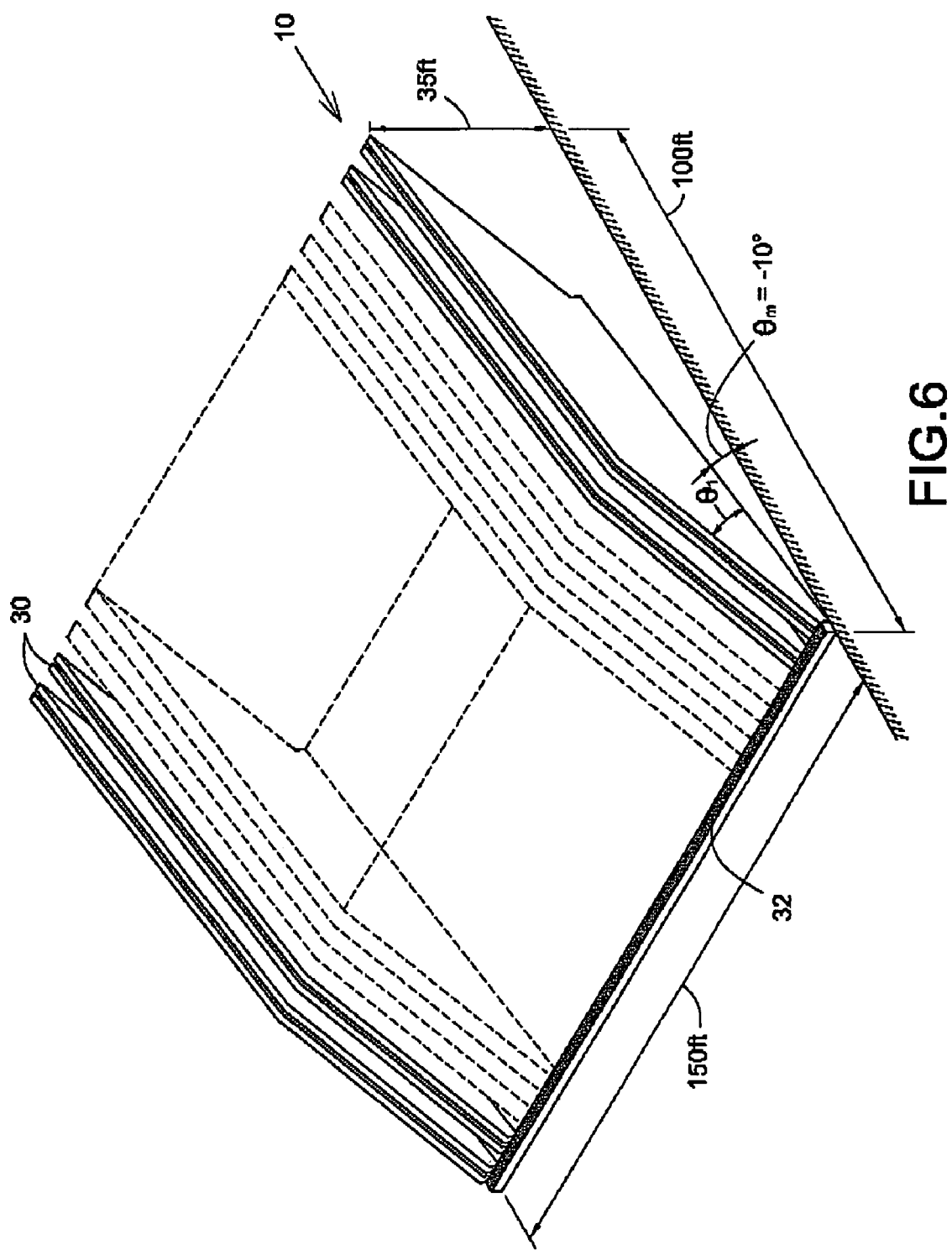
FIG. 6 is an isometric view of a group of mixing sub-systems built in pairs and all having downwardly sloping mixing conveyors which merge onto a main order staging conveyor.

FIG. 6 illustrates an exemplary embodiment of the present invention showing an arrangement including 750 product SKUs (Stock Keeping Units) arranged into a mixing system where fifty groups or series 30 of fifteen different product storage guides 16 merge onto respective downwardly sloping mixing conveyors 20 which could consist of non powered gravity roller conveyors at an about 10 degree angle. The sequences of products thus created are then merged onto a transversal central order sequencing conveyor 32, for a minimum overall volume space covering an area of about 150 ft wide by about 100 ft long extending over about 35 ft high.

Re-Stocking Sub-System 12

FIG. 2 shows an embodiment of a manually re-stocked mixing sub-system 12', with angled product guides 16' which are relatively short and steep compared to those in the automated re-stocking sub-system 12 of FIGS. 1 and 3. In the manual configuration shown the mixing conveyor 20 is horizontal ($\Theta_m=0$).

The automated re-stocking sub-system 12 is composed of a common re-stocking guide 34 located above the angled product storage guides 16 and the mixing conveyor 20 there below. This common re-stocking guide 34 can be made of a series of transfer devices 36 (see FIG. 3) which can selectively pivot down to load the angled product storage guides 16.

These transfer devices 36 allow a stream of products of the same type to be diverted into the appropriate angled product storage guide 16. In embodiments when the transfer devices 36 are not being lowered to load the angled product storage guides 16, they are in line with each other and form part of the restocking conveyor 34.

Depalletizing Sub-System (Not Illustrated)

The re-stocking conveyor 34 of the automated re-stocking sub-system 12 can be fed by a gantry robot layer de palletizing system, and/or several dedicated depalletizers for high moving products, or by mechanized layer depalletizing using a special tool which can be a forklift attachment. This forklift attachment can be quite sophisticated, providing sensors and controls which minimize reliance upon the skill of the forklift truck operators.

Sequenced Product Accumulation Buffers (Not Illustrated)

Separate sequences of mixed products formed on separate mixing conveyors are held in accumulation prior to merging into one complete sequence which forms one client order.

Merging can be accomplished in a traditional way using merging conveyor devices or by vertically stacking horizontal accumulation buffers and merging the products using flip down chutes.

Although the present apparatus has been described with a certain degree of particularity, it is to be understood that the disclosure has been made by way of examples only and that the present invention is not limited to the features of the embodiments described and illustrated herein, but includes all variations and modifications within the scope and spirit of the invention as hereinafter claimed.

I claim:

1. An order handling system for merging product cases including an automatic depalletizing sub-system, a product restocking sub-system, said sub-systems being controllably adapted to deliver product cases to a mixing sub-system, said mixing sub-system comprising a plurality of angled product storage guides vertically stacked one above the other and at least one mixing conveyor in vertical alignment with one another and with at least one mixing conveyor, said product storage guides forming thereby a vertical array thereof, said storage guides being provided with associated product release devices selectively delivering product cases directly onto said at least one mixing conveyor, each storage guide having one said associated product release device extending therefrom.

2. A system according to claim 1 in which more than one vertical array of product storage guides is provided, said arrays being disposed side-by-side.

3. A system according to claim 2 wherein product release and retention mechanisms are provided in association with respective said product storage guide and adapted to release product cases in a predetermined sequence according to type and quantity onto the mixing conveyor, the sequence, type and quantity being defined by a client order, whereby the order or a part thereof is completed.

4. A system according to claim 3 wherein a control system is provided to control the release of product cases in said predetermined sequence.

5. A system according to claim 1 wherein the product storage guides are of an accumulating type and may be powered or gravity operable.

6. A system according to claim 1 wherein the product storage guides are of a non-accumulating type and may be powered or gravity operable.

7. A system according to claim 1 wherein the product storage guides are provided with means for varying the speed of travel of product cases therealong, whereby appropriate devices being associated therewith for that purpose.

8. A system according to claim 7 wherein the speed varying means are brake rollers.

9. A system according to claim 1 wherein the product storage guides are disposed at a guide angle relative to said at least one mixing conveyor depending upon the physical characteristics of the product case.

10. A system according to claim 9 wherein said at least one mixing conveyor is disposed at a mixing angle relative to a ground floor in accordance with product case requirements and in complementary manner with said guide angle.

11. A system according to claim 1 wherein the product re-stocking sub-system is automated and is operable upon an appropriate command from a central control adapted to monitor the flow of product cases in the various sub-systems with the object of replenishment as and when required.

12. A system according to claim 1 wherein the product re-stocking sub-system comprises a number of orientable transfer devices constituting a restocking conveyor, each said orientable transfer device being adapted to selectively transfer product cases onto respective said product storage guide downwardly located therefrom.

13. A system according to claim 12 wherein the restocking conveyor is fed by the depalletizing sub-system.

14. An order handling system arrangement including a plurality of order handling systems according to claim 1 disposed side-by-side for merging product cases, said systems being controllably adapted for selective delivery of product cases onto at least one transversal central order sequencing conveyor.

15. A system according to claim 1, wherein said associated product release devices are associated product release guides.

16. A system according to claim 1, wherein said associated product release guides are lowerable.

* * * * *